(12) United States Patent
Nathan et al.

(10) Patent No.: US 6,454,033 B1
(45) Date of Patent: *Sep. 24, 2002

(54) ELECTRO-HYDRAULIC VEHICLE WITH ENERGY REGENERATION

(75) Inventors: Guy Nathan, Yerres; Paul Berneuil, Paris, both of (FR)

(73) Assignee: Touchtunes Music Corporation, Las Vegas, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 62 days.

(21) Appl. No.: 09/077,519

(22) PCT Filed: Oct. 1, 1996

(86) PCT No.: PCT/FR96/01531

§ 371 (c)(1), (2), (4) Date: Jul. 15, 1998

(87) PCT Pub. No.: WO98/14344

PCT Pub. Date: Apr. 9, 1998

(51) Int. Cl.$^7$ ................................................. B60K 1/04
(52) U.S. Cl. .................... 180/65.1; 180/65.3; 180/65.8; 180/307; 318/376; 701/22; 60/484; 60/474; 60/414
(58) Field of Search ................................ 180/307, 65.8, 180/65.3, 65.1, 65.2, 305, 308; 60/484, 494, 414; 318/375, 376; 701/22

(56) References Cited

U.S. PATENT DOCUMENTS 3,866,420 A * 2/1975 Appel ........................ 60/494
4,424,673 A * 1/1984 Polanski et al. ............... 60/494
4,846,046 A * 7/1989 Kanai et al. .................. 60/494
4,881,450 A * 11/1989 Hirata et al. .................. 60/484
4,888,949 A * 12/1989 Rogers ........................ 60/494
5,079,919 A * 1/1992 Nakamura et al. ............ 60/484
5,230,402 A 7/1993 Clark et al.
5,299,420 A * 4/1994 Devier et al. .................. 60/484

FOREIGN PATENT DOCUMENTS

| DE | 25 15 694 A | 10/1976 |
| DE | 42 26 453 A | 2/1994 |
| DE | 43 25 703 A | 2/1995 |
| FR | 2 709 453 A | 3/1995 |
| FR | 2 732 652 A | 10/1996 |

OTHER PUBLICATIONS

Patent Abstracts of Japan vol. 18, No. 220 (M–1595), Apr. 20, 1994 & JP 06 016051 A (Nippon Soken Inc), Jan. 25, 1994 see abstract.

* cited by examiner

Primary Examiner—Brian L. Johnson
Assistant Examiner—Hau Phan
(74) Attorney, Agent, or Firm—Nixon & Vanderhye, P.C.

(57) ABSTRACT

A vehicle including a battery (61) powering an electrical motor (60), the electric motor (60) operating when the vehicle is driving at a nominal speed in order to drive, at a constant speed, a variable displacement hydraulic pump (4) which is connected to at least one variable displacement hydraulic motor (3). The hydraulic motor indirectly drives wheels of the vehicle. The variable displacement pump is electronically controlled and managed by a circuit which monitors, manages and controls (9) an angle of a cam plate which controls variable displacement of hydraulic pump (4).

11 Claims, 4 Drawing Sheets

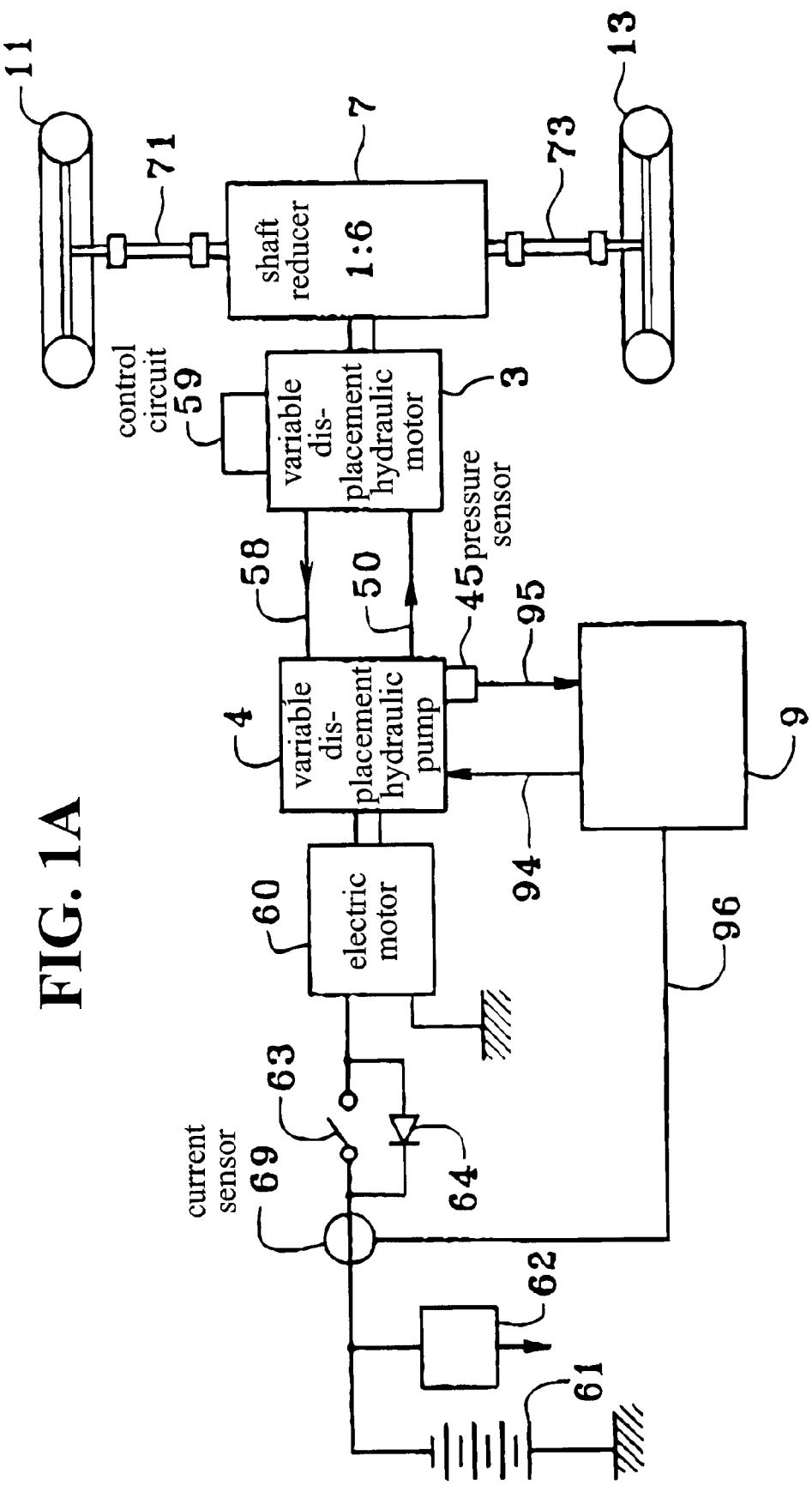

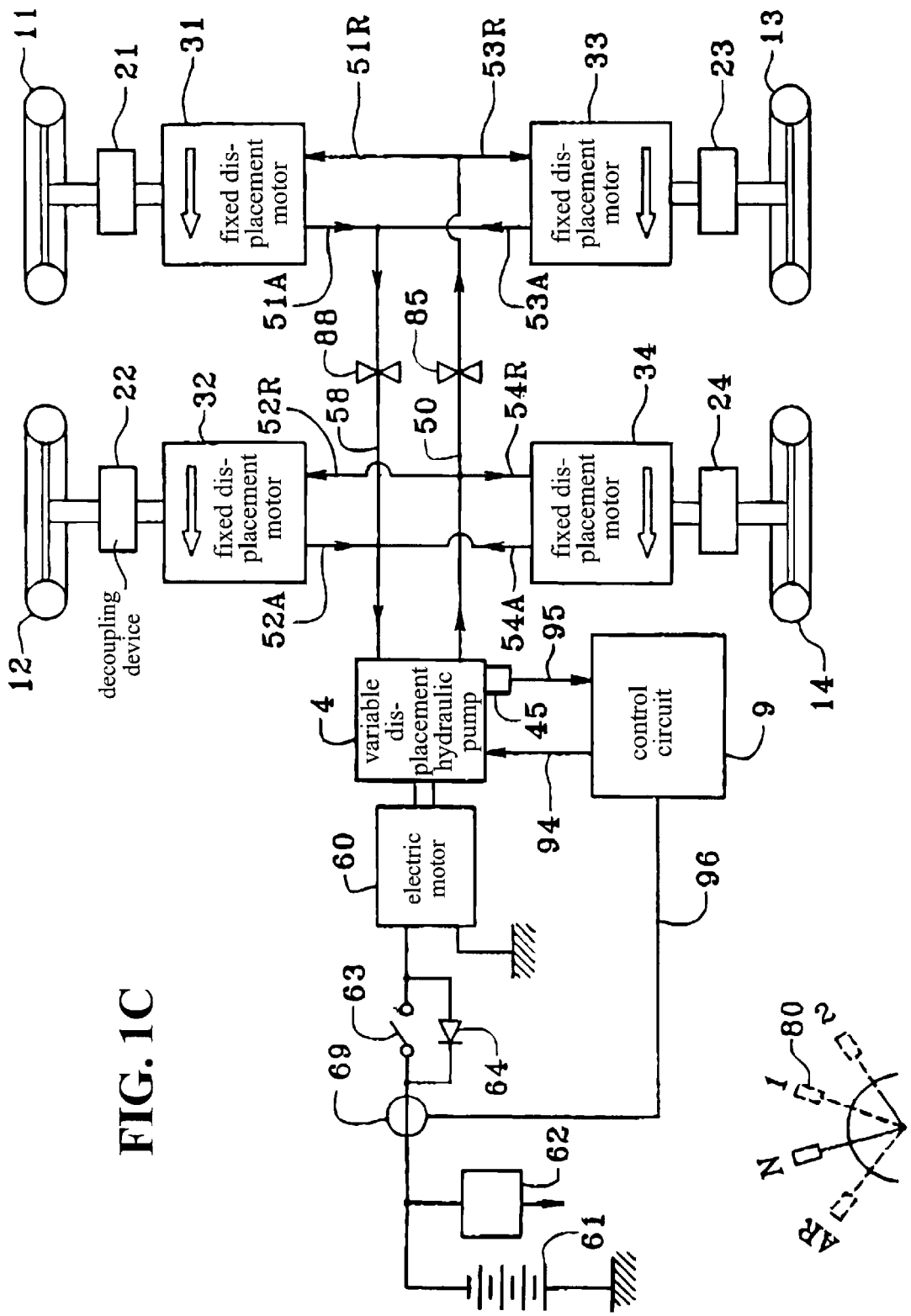

ELECTRO-HYDRAULIC VEHICLE WITH ENERGY REGENERATION

BACKGROUND OF THE INVENTION

This invention relates to an electrohydraulic vehicle with energy regeneration.

Vehicles with electrical drive are known from the prior art and they have a variable speed obtained by connecting to the electrical motor a variable-speed drive unit which, using direct or alternating current, will generate the signals necessary for control of an ac or dc electrical motor to obtain variable rpm of this motor. It is well known that optimum performance of this device is obtained when the motor is running at the nominal rpm; at other rpm performance is less than this optimum. Likewise, in vehicles with closed loop hydrostatic transmission, it is known in the prior art that the motors generally used are of the fixed displacement type, thereby causing incompatibility between the necessary (possible) flow rate and the pressure range for which they were designed, and not allowing them to reach high-vehicle speeds, while having a size adequate to provide the maximum torque necessary for starting out or climbing a steep hill.

SUMMARY OF THE INVENTION

The first object of the invention is therefore a vehicle with electrohydraulic drive which optimizes the operating conditions of the electrical motor powered by a battery, and on the other hand, obtaining both a high starting torque when this is necessary and speeds sufficient to allow the vehicle to speed without having to overdimension the hydraulic components.

This object is attained in a first embodiment by the fact that the vehicle has a battery powering an electrical motor when the vehicle is moving at its nominal speed in order to drive, at constant speed, a variable displacement hydraulic pump which is electronically controlled and managed by a circuit which monitors, manages and controls the angle of the cam plate which controls the variable displacement of the axial piston hydraulic pump which is connected in closed circuit via lines to at least one variable displacement hydraulic motor with a displacement which is monitored and controlled-hydraulically within a range limited by the maximum displacement and a non-zero minimum displacement, said hydraulic motor indirectly driving one or more wheels of the vehicle.

This object is attained in a second embodiment by the fact that the vehicle has battery (61) powering electric motor (60), said electric motor operating when the vehicle is moving at its nominal speed to drive, at a constant speed, variable displacement hydraulic pump (4) controlled and managed electronically by circuit (9) which monitors, manages and controls the angle of the cam plate which controls the variable displacement of hydraulic pump (4) which is connected in a closed circuit via lines to a variable displacement assembly of hydraulic motors (31 to 34), each with a fixed displacement, wherein the displacement of the assembly is hydraulically modified by valves (88, 85) in a range limited by the maximum displacement of all fixed displacement motors (31 to 34) and a non-zero minimum displacement, each of these hydraulic motors (31 to 34) being connected to one wheel of the vehicle (11 to 14) via disengagement means (21 to 24), allowing disengagement of the wheels depending on the variation of the assembly displacement.

Another object of the invention is a circuit for controlling a vehicle of this type in such a way that the actions performed by the driver are continually monitored and controlled by the control circuit to optimize operating conditions and energy regeneration of the vehicle.

This object is attained by the fact that the circuit which monitors and controls the angle of the cam plate which controls the variable displacement of the pump, receives on the one hand information indicating the pressure of the fluid between the pump and the hydraulic motor, and on the other hand, information indicating either the current discharged by the battery to the electrical motor during the driving phases either of the current generated by the electrical motor during braking or deceleration phases and uses this information to correct the control signal of the angle of the cam plate as a function of the reference threshold values.

According to another characteristic, the reference threshold values set by the circuit which monitors, manages and controls the angle of the cam plate allow the battery to be recharged during braking or deceleration phases of the vehicle.

According to another characteristic, the circuit which manages the control voltage of the cam plate determining the pump displacement variation receives a signal indicating the degree to which the accelerator is depressed, a signal from a switch indicating forward or reverse motion of the vehicle, a signal indicating the actuation of the brake pedal, a signal generated by a first circuit which indicates enabling of forward/backward motion of the vehicle and a signal generated by a second circuit indicating the maintenance of the control voltage for the management circuit to limit variation of the control voltage.

Another characteristic is the output of an "OR" logic circuit with three inputs, one input of which receives a signal indicating the charge state of the battery;

another input receives a signal indicating the current discharged or received by the battery;

the third input receives a signal indicating the pressure of the fluid between the pump and the motor compared to a maximum reference pressure.

According to another characteristic, the pressure signal is delivered by the output of a comparator, receiving at one of its inputs the signal from the pressure sensor originating from the circuit between the pump and the hydraulic motor, and on the other hand a reference voltage indicating maximum pressure.

According to another characteristic, the circuit generating the signal indicating the charge current generated by the electric motor to the battery or the current discharged by the battery in the electric motor is comprised of a comparator which receives at one of its inputs the output signal of an amplifier of the absolute value of the current measured by a current loop sensor, and at its second input a signal indicating a reference current $I_0$, $I_1$, $I_2$ which will depend on detection of the polarity on the one hand, and on the other hand, detection of actuation of the brakes.

According to another characteristic, polarity is detected by a polarity detector circuit which actuates during detection of a reversal in the direction of the current signalling charging of the battery, actuation of a switch enabling the power supply voltage of the electronic circuit to be switched from a first position powering a first element which generates a first signal indicating first maximum current $I_0$ allowable by the electric motor, to a second position powering a second element which generates a second signal indicating second current $I_1$ corresponding to a vehicle deceleration current.

According to another characteristic, the brake actuation detection switch controls the changeover switch for the power supply voltage of the electronic circuit on a third circuit providing a voltage indicating a fixed or variable vehicle braking current $I_2$.

According to another characteristic, the electric motor is of the direct current and parallel excitation type.

According to another characteristic, the electric motor is of the alternating current and synchronous or asynchronous type and the electrical power supply circuit from the battery includes a current inverter.

BRIEF DESCRIPTION OF THE DRAWINGS

Other characteristics and advantages of this invention will be revealed in the description below with reference to the following attached drawings, wherein:

FIG. 1A shows a schematic view of the electrohydraulic drive device of the vehicle according to a first embodiment;

FIG. 1C shows a third embodiment of the drive device of the electrohydraulic vehicle.

DETAILED DESCRIPTION OF THE PREFERRED EMBODIMENTS

Figure 1B:
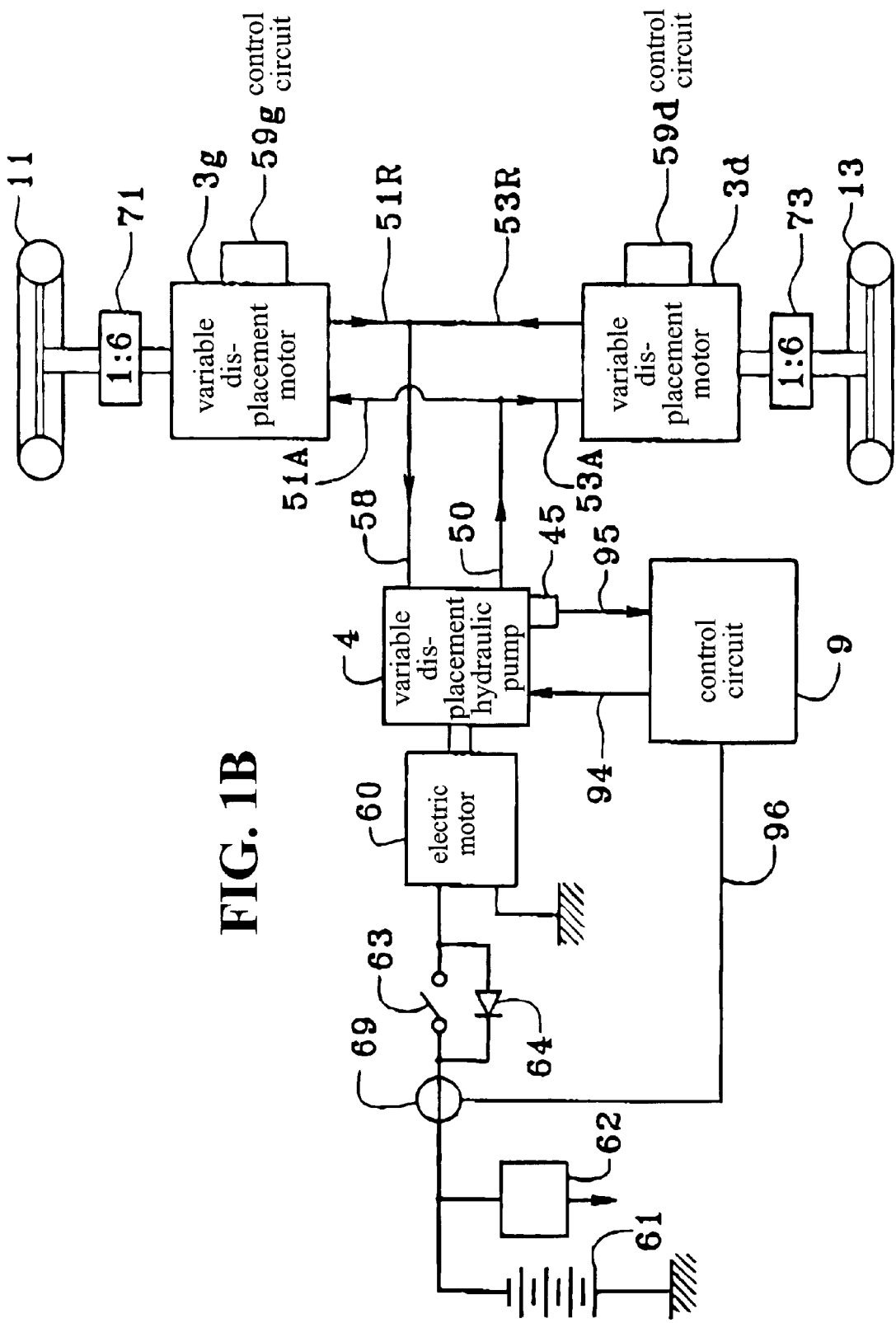
FIG. 1B shows a second embodiment of the drive device of the electrohydraulic vehicle.

The vehicle is comprised, in the first embodiment shown in FIG. 1A, of battery (61) which supplies direct current via switch (63) and line (65) to electric motor (60). In the embodiment shown, electric motor (60) is of the direct current and parallel excitation type. In other embodiments of the invention, the electric motor could be of the synchronous or asynchronous alternating motor type and in this case it is sufficient to add to the electrical circuit a current inverter. The optional current inverter and the electric motor are designed to allow operation of the electric motor at virtually constant nominal speed which will be on the order of 3000 rpm. This motor (60) drives via its output shaft of variable displacement hydraulic pump (4). This hydraulic pump (4) is connected by feed or delivery line (50) and return or intake line (58) to variable displacement hydraulic motor (3). This variable displacement hydraulic motor (3) is in fact a pump used as a motor, whose mechanical or electronic control for managing the angle of the cam plate was replaced by hydraulic circuit (59) which is comprised of a hydraulic unit for angular control of the angle of the hydraulic motor cam plate based on fluid pressures sampled at the intake and delivery outputs of the hydraulic motor for mechanical actuation of the incline of the hydraulic motor cam plate in an angular range limited by the maximum possible value and a lower non-zero value determined by the performance desired for transmission. The pumps used in pump (4) or in hydraulic motor (3) are of the axial piston type such as for example those sold by the "Danfoss" company under list number HTP 25, 40 and 63 depending on the displacement chosen for the power needed.

Motor (3) drives via its output shaft reducer (7) which also has a differential whose two output shafts drive via universals (71, 73) assigned wheels (11 and 13 respectively). The reducer is connected via a mechanical or other link to the forward or reverse motion or neutral control lever in order to—when placed in neutral—cause the reducer to disengage, allowing free wheel positioning of the wheels. Moreover, depending on the position of the control lever corresponding to forward or reverse motion, cam plate of pump (4) will have an opposite inclination in relation to the neutral position corresponding to the zero angle.

Control circuit (9) receives via link (95) a signal from pressure sensor (45) mounted on pump (4) and indicating the pressure existing in feed line (50) of hydraulic motor (3). This same control circuit (9) delivers by its output (94) a signal for the actuator (incorporated in a conventional manner in the pump) which controls the angle of the displacement variation cam plate of the pump (4). This circuit (9) receives via link (96) information supplied by current sensor (69), indicating the electrical current circulating between battery (61) and motor (60), either as a power supply current of the motor or as regeneration current for charging the battery when the electric motor (60) is operating as a generator. In this latter case, switch (63) of the circuit connecting the battery to electric motor (60) will be open and the regeneration current will circulate through diode (64) of the electrical circuit, installed in reverse and in parallel on switch (63).

Figure 2:
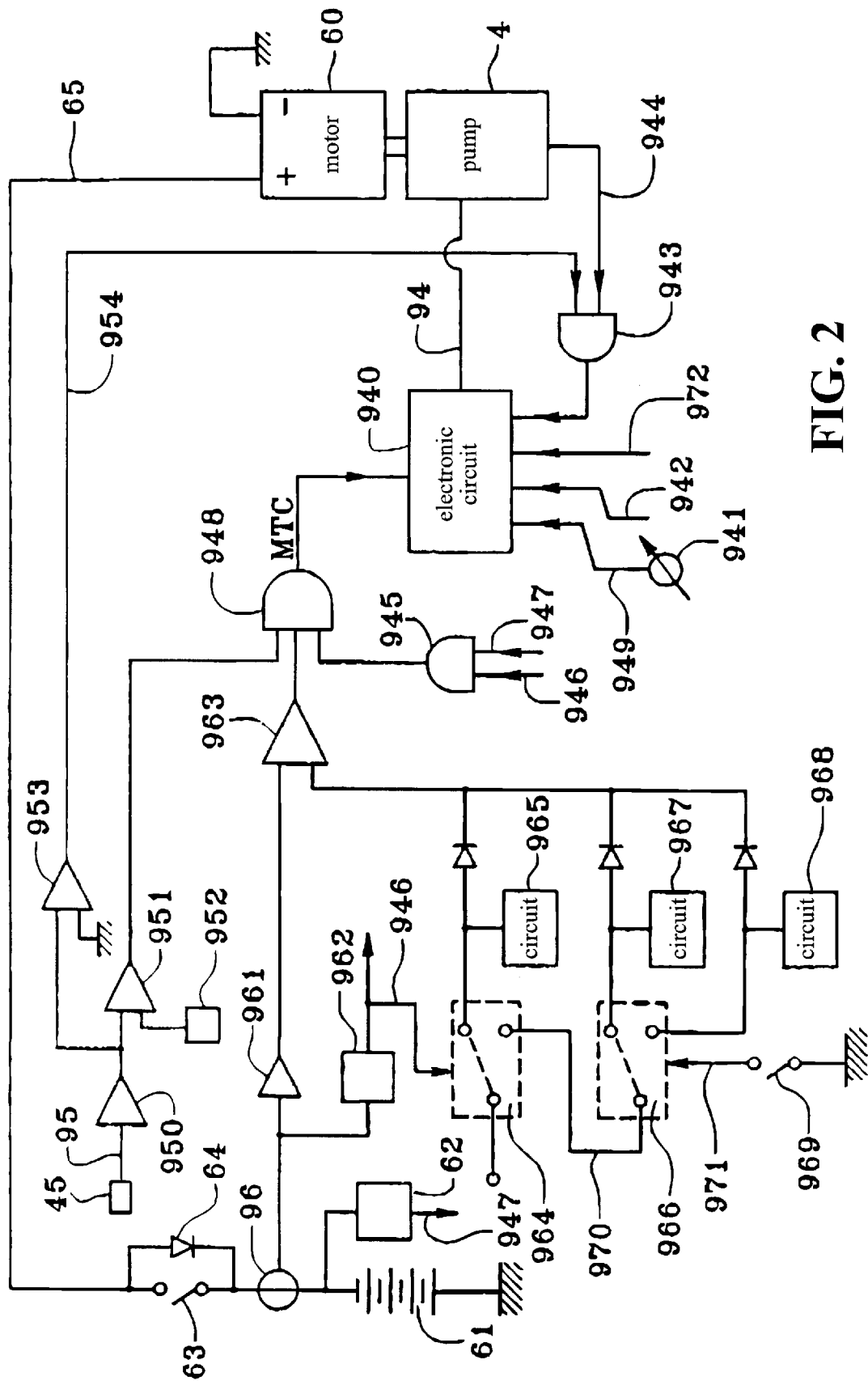
FIG. 2 shows a block diagram of the control circuit of the displacement variation cam plate of the pump for the electrohydraulic vehicle according to any of FIGS. 1A, 1B or 1C.

Control circuit (9), shown schematically and in more detail in FIG. 2, is comprised of electronic circuit (940) for managing the control voltage of the displacement variation cam plate of pump (4). This electronic circuit (940) supplies via its output (94) a voltage enabling control of the inclination of the cam plate in such a way as to determine the displacement of pump (4). This control varies as a function of a signal indicating the position of the vehicle accelerator which is received at input (949) of circuit (940). This signal is supplied by potentiometer (941) coupled to the accelerator pedal and the voltage supplied by this potentiometer at input (949) is proportional to the degree to which the accelerator is depressed. Depending on this signal, electronic circuit (940) for managing the control voltage will supply at its output a voltage (94) which will vary in terms of a ramp in proportion to control of the accelerator, this ramp having a positive or negative slope as a function of information received at another input of management circuit (940) and representing the forward or reverse motion control supplied on a line (942) by a switch connected to the control lever for forward/reverse motion. The positive or negative value of the voltage ramp will also be enabled by information supplied by the output of AND gate (943) with two inputs, one of which receives signal (944) indicating the rotation of pump (4) and another input receives signal (954) indicating zero or non-zero pressure of the fluid at the output of the pump. This signal is supplied via the output of comparator (953), one input of which, for example the one connected to ground, receives a reference voltage representative of the value 0 and the other input receives the output voltage from amplifier (950). The input of amplifier (950) receives output signal (95) from pressure sensor (45) plugged into the output of pump (4). comparator (953) will supply a signal with logic value "1" when the pressure is zero, that is, when the user of the vehicle will be able to effectively move from forward to reverse.

The braking information (971) supplied by switch (969) is received at input (972) of circuit (940). This braking information (971) will be interpreted by circuit (940) as being equivalent to the minimum value of the potentiometer of accelerator (941) corresponding to a zero pressure on the accelerator pedal. This function prevents the action of the accelerator when the brake is actuated.

Variation of the control voltage which is supplied on line (94) to pump (4) and which is generated by circuit (940) will be limited by the circuit described below which will supply at the output the MTC [maintenance of control voltage]

signal. This circuit is comprised of OR gate (948) with three inputs, the first of which receives the output of AND gate (945) with two inputs. This AND gate (945) receives at its input (946) information indicating the sign of the current supplied by polarity detector (962) and at its input (947) a voltage indicating the charge state of battery (61) supplied by circuit (62) which monitors the charge state of the battery. When the charge state of the battery is at its maximum and when the information indicating the sign of the current corresponds to energy regeneration, AND gate (945) supplies a logic signal "1" which via OR gate (948) will release an MTC signal at logic level "1". This will block the evolution of the value of the control voltage (94), by acting on the variation of cam plate control and suppress it. The second input of the OR gate (948) receives the output of comparator (951) whose first input receives a first signal indicative of the hydraulic pressure at the output of the pump. This first signal is supplied by the output of amplifier (950). This first signal is compared to a reference voltage indicative of reference pressure supplied by circuit (952). There again, when the pressure in the circuit becomes equal to the reference pressure, comparator (951) releases a voltage corresponding to logic value "1". OR gate (948) will generate a signal corresponding to logic value "1" which will block the evolution of the value of the control voltage acting on the variation of control (94) of the cam plate of pump (4).

Finally, the third input of the OR circuit is comprised of the output of third comparator (963), one input of which is connected to the output of circuit (961) supplying a voltage indicating the absolute value of current circulating in line (65) which supplies power to motor (60). This voltage representative of the current is sampled by current loop sensor (96). The output of this sensor (96) is also sent on circuit (962) which detects the polarity of the voltage representative of the sign of the current. This polarity detector will control the triggering of reversing switch (964) when the polarity of the current indicates a regeneration current supplied by motor (60), in deceleration modes and during actuation of the vehicle brake pedal.

Reversing switch (964) toggles between two positions which place in an alternating relation a power supply voltage, either with circuit (965) allowing supply of a voltage indicative of a reference current $I_0$ corresponding to the maximum current allowable by electric motor (60), or with second circuit (970). In this case reversing switch (964) triggers on intermediate line (970) which is connected to second reversing switch (966), triggering of which is controlled by switch (969) connected to actuation of the vehicle brake. If the brake is not being actuated, this reversing switch (966) supplies power to circuit (967) intended to supply to comparator (963) a signal $I_1$ indicative of a reference corresponding to a slowing current which is the current generated by motor (60). When actuation of the brake pedal is detected by switch (969), the latter, by closing the electrical circuit, controls toggling of reversing switch (966) which triggers transmission of power supply voltage by line (970) on circuit (968). This circuit (968) makes it possible to supply a reference voltage proportional to a reference current $I_2$ which is fixed or variable and corresponds to a predetermined braking current and charge current allowable by the battery which can be generated during braking. In one embodiment, variable value $I_2$ is defined by a value relating to the physical pressure exerted by the user on the brake pedal, in such a way as to promote braking by energy regeneration as opposed to braking by thermal dissipation obtained by the brake pads. This value can be obtained by installing, in the hydraulic brake circuit, a hydraulic pressure sensor to supply an electric analog value, which may or may not be either proportional and nonlinear according to a defined law and which corresponds to this variable reference $I_2$ and is able to detect the charge state of the battery (61). The three diodes d1, d2, d3 provide for an analog OR function for references $I_0$, $I_1$, $I_2$.

In operation, when the value of the current indicated by the output of the amplifier as an absolute value (961) corresponds to one of the three reference values supplied by one of three diodes d1, d2, d3 and fixed as a function of the position of reversing switches (964, 966), comparator (963) supplies at its output a signal of logic level "1" which will block the evolution of the value of the control voltage acting on the variation of the cam plate control in circuit (940). Thus in phases of acceleration or start-up, the current circulating in cable (65) which supplies power to the motor will always be limited to the maximum value fixed by circuit (965).

When the user releases the accelerator pedal to slow the vehicle, the operation of hydraulic transmission (3, 4) will be reversed and hydraulic motor (3) will operate as a pump in which the angle of inclination of the cam plate will be managed by hydraulic circuit (59) within fixed limiting values and as a function of the hydraulic pressure resulting from the resisting torques generated by the wheels, originating from the inertia of the vehicle. Pump (4) will function as a motor, the cam plate angle of which will be managed by circuit (940). At that moment, the rpm of the pump (4) increase, causing an increase in the rpm of the electric motor, which then begins to operate as a current generator. When the voltage supplied by the electric motor operating as a generator becomes greater than battery voltage (61), the electric motor supplies a current which is used to recharge the battery. When the accelerator pedal is only partially released, switch (63) remains closed and this regeneration current passes directly into the battery to recharge it. When the accelerator pedal is completely released, switch (63) opens and the regeneration current passes through the diode (64). Switch (63) opens and the regeneration current passes through diode (64). Switch (63) is comprised for example of a power relay whose coil is powered either by actuation switch for the brakes (969), or by the switch connected to the accelerator pedal. The act of pressing the brake closes switch (969) and cuts power supply from electric motor (60) by opening switch (63). In both cases, detection of reversal in the sign of the current causes reversing switch (964) to switch, placing the power supply voltage in contact with link (970) and setting current reference $I_1$ via the circuit (967). While the deceleration current measured at the output of amplifier (961) remains lower than reference $I_1$, comparator (963) has no logic output at level 1, and as soon as the current becomes equal to reference $I_1$, the comparator produces a logic output at level 1 which will block the evolution of the value of the control voltage acting on the variation of cam plate control.

When the user, after having completely removed his foot from the accelerator, presses down on the brake pedal, this act causes contact (969) to close, which actuates reversing switch (966) in such a way as to cause it to toggle from the position shown by the dotted line to the position in which line (970) is in communication with circuit (968). In this latter case, the value of the regeneration current will increase until it is equal to reference value $I_2$, thereby increasing the braking effect of the electrohydraulic assembly. In the braking or deceleration phase, the angle of variation of the cam plate will allow pump (4), functioning as a hydraulic motor, to turn more or less quickly and drive more or less quickly electric motor (60). Depending on the angle of the cam plate and rpm of electric motor (60), the user will obtain a braking effect and at the same time a current which will allow recharging of the battery (61).

In the second embodiment of the invention as shown in FIG. 1B, electric motor (60) drives variable displacement hydraulic pump (4). This pump (4) is linked via its intake line (58) and delivery line (50) to variable displacement two motors (3d, 3g) controlled as before by respective boxes (59d, 59g). Right (3d) and left (3g) motors are respectively on the one hand connected to delivery line (50) via line (53A) and (51A) respectively and on the other hand to intake line (58) via line (53R) or (51R) respectively. The output shaft of each hydraulic motor (3d, 3g) is connected to its respective wheel (13, 11) of the vehicle by respective reduction gear (73, 71). The other components of this version are in every way identical to the first version. Operation is also identical with the exception that the neutral position of the lever which controls the vehicle transmission disengages the two reduction gears (71, 73).

In a third embodiment of the invention shown in FIG. 1C, variable displacement hydraulic pump (4) powers four fixed displacement hydraulic motors (31 to 34). The output shaft of each fixed displacement motor (31 to 34) is linked via respective mechanical decoupling device (21 to 24) to respective wheel (11 to 14) linked to the motor to allow decoupling of each of the wheels during certain operations, for example towing or changing of displacement. Respective fluid delivery lines (51A to 54A) to respective motors (31 to 34) are linked to exhaust line (50) of the pump and respective lines (51R to 54R) for return of the fluid from respective motors (31 to 34) are linked to intake line (58) of the pump. Power supply for the motors of the rear axle of the vehicle comprised of motors (31) and (33) can be suppressed via solenoid valves (85) or (88) respectively provided on intake lines (50) and delivery lines (58). These fixed displacement motors can be, for example, wheel motors of the high-torque, slow-speed orbital type of the "OMS" series sold by the "Danfoss" company. The other components of the vehicle are identical to those in the first embodiment, with the exception of control lever (80) which selects either reverse (AR) or neutral (N), or forward with high torque and low speed (1), or forward with low torque and high speed (2). The positions of the selection lever are respectively: AR, N, 1, 2. The "AR" [reverse] position actuates the signal applied to input (942) of circuit (940) as described for the other embodiments. The "N" position acts mechanically or electrically on decoupling devices (21), (22), (23), (24) by closing of valves (88), (85), by coupling wheel (12) to motor (32) and wheel (14) to motor (34) by means of disengagement devices (22) and (24) respectively, by decoupling wheel (11) from motor (31) and wheel (13) from motor (33) by means of decoupling device (21) and (23) respectively. Position "2" acts simultaneously mechanically or electrically on two valves (88), (85) and decoupling devices (21), (22), (23), (24) by opening valves (88), (85) and coupling four wheels (12), (14), (11), (13) to four motors (32), (34), (31), (33) by means of respective devices (22), (24), (21), (23). Lever (80) can only be actuated when the vehicle is stopped, a state enabled by information from "AND" function (943). The rest of the operation of circuit (9) is identical to that described for the embodiment shown in FIG. 1A.

In the different versions of the vehicle, it goes without saying that the vehicle is equipped with a conventional braking system which supplements or completes the regenerative braking obtained with the invention.

Other modifications within the knowledge of one skilled in the art are also included in the scope of the invention.

Thus the logic circuits in FIG. 2 could be replaced in whole or in part by a microcontroller connected to a suitable program and to interfaces necessary for carrying out the same functions as the circuit in FIG. 2.

What is claimed is:

1. A vehicle comprising a battery (61) powering an electrical motor (60), said electric motor (60) operating when the vehicle is driving at a predetermined speed in order to drive a variable displacement hydraulic pump (4) at a constant speed which is connected in closed circuit via lines to at least one variable displacement hydraulic motor (3) with a displacement which is monitored and controlled hydraulically within a limited range, said hydraulic motor indirectly driving one or more wheels of the vehicle (11 to 14), wherein the variable displacement pump is electronically controlled and managed by a circuit which monitors, manages and controls (9) an angle of a cam plate which controls the variable displacement of the hydraulic pump (4), said circuit, which monitors and controls the angle of the cam plate which controls the variable displacement of the pump, receiving information indicating a pressure of a fluid between the pump and the hydraulic motor, and information indicating either a current discharged by the battery to the electrical motor during the driving phases or of a current generated by the electrical motor during braking or deceleration phases and uses this information to control the angle of the cam plate as a function of reference threshold values for a cylinder capacity of the variable displacement hydraulic motor to vary in a range limited by a maximum displacement and a minimum non-zero displacement.

2. A vehicle as claimed in claim 1, wherein the reference threshold values set by the circuit which monitors, manages and controls the angle of the cam plate allow the battery to be recharged during braking or deceleration phases of the vehicle.

3. A vehicle as claimed in claim 1, wherein the circuit (940) which manages the control voltage of the cam plate determining the pump displacement variation receives a signal (949) indicating a degree to which an accelerator is depressed, a signal (942) from a switch indicating forward or reverse motion of the control of forward/reverse motion of the vehicle, a signal generated by a first circuit (943) which indicates enabling of forward/backward motion of the vehicle, a signal (971) on input (972) of circuit (940) indicating actuation of a brake pedal, and a signal generated by a second circuit (948) indicating maintenance of the control voltage for the management circuit to limit variation of the control voltage.

4. A vehicle as claimed in claim 3, wherein the signal from second circuit (948) includes output of an OR logic circuit with three inputs, of which the first input receives a signal which is a function of signal (947) indicating the charge state of the battery generated by circuit (62) which monitors the charge state of the battery and of signal (946) which indicates the direction of the current;

the second input receives a signal indicating the current discharged or received by the battery;

the third input receives a signal indicating the pressure of the fluid between the pump and the motor compared to a maximum reference pressure.

5. A vehicle as claimed in claim 4, wherein the pressure signal is delivered by the output of comparator (951), receiving at one of its inputs the signal from the pressure sensor originating from the circuit between the pump and the hydraulic motor, and a reference voltage indicating maximum pressure.

6. A vehicle as claimed in claim 5, wherein brake actuation detection switch (969) controls a changeover switch (966) which switches the power supply voltage on a third circuit (968) providing a voltage indicating a fixed or variable vehicle braking current ($I_2$) and the opening of switch (63) which cuts off power supply to electric motor (60).

7. A vehicle as claimed in claim 4, wherein the circuit generating the signal indicating the charge current of the battery or the current discharged by the battery in electric motor (60) is comprised of a comparator (963) which receives at one of input the output signal of amplifier (961) of the absolute value of the current measured by current loop sensor (96), and at its second input a signal indicating a reference current ($I_0$ or $I_1$ or $I_2$) which depends on detection of the polarity (962), and detection of actuation of the brakes.

8. A vehicle as claimed in claim 4, wherein polarity is detected by a polarity detector circuit which actuates during detection of a reversal in the direction of the current signalling charging of battery (61), actuation of changeover switch (964) enabling switching of the power supply voltage from a first position powering first element (965) which generates a first signal indicating first maximum current ($I_0$) allowable by the electric motor, to a second position powering second element (967) which generates a second signal indicating second current ($I_1$) corresponding to a vehicle deceleration current.

9. A vehicle as claimed in claim 1, wherein the electric motor is of the direct current and parallel excitation type.

10. A vehicle as claimed in claim 1, wherein the electric motor is of the alternating current and synchronous or asynchronous type and the electrical power supply circuit from the battery includes a current inverter.

11. A vehicle comprising a battery (61) powering an electric motor (60), said electric motor operating when the vehicle is moving at a predetermined speed to drive a variable displacement hydraulic pump (4) at a constant speed which is connected via lines to a variable displacement assembly of hydraulic motors (31 to 34), each with a fixed displacement, of which the displacement of the assembly is hydraulically modified by valves (88, 85) in a limited range, each of these hydraulic motors (31 to 34) driving one wheel of the vehicle (11 to 14) via a disengagement unit (21 to 24), allowing disengagement of the wheels depending on variation of the assembly displacement, wherein the variable displacement hydraulic pump (4) is electronically controlled and managed by a circuit which monitors, manages and controls (9) an angle of a cam plate which controls a variable displacement of the hydraulic pump (4), said circuit which monitors and controls the angle of the cam plate which controls the variable displacement of the pump receiving information indicating a pressure of a fluid between the pump and the hydraulic motor, and information indicating either a current discharged by the battery to the electrical motor during driving phases or a current generated by the electrical motor during braking or deceleration phases and using this information to control the angle of the cam plate as a function of reference threshold values for a cylinder capacity of the assembly of hydraulic motors to vary in a range limited by a maximum displacement of all the motors (31 to 34) of fixed displacement and a minimum non-zero displacement.

* * * * *